United States Patent
Suzuki et al.

(10) Patent No.: US 6,176,769 B1
(45) Date of Patent: Jan. 23, 2001

(54) CERAMICS DRESS SUBSTRATE AND METHOD OF USING THE DRESS SUBSTRATE

(75) Inventors: Masato Suzuki; Shirohito Matsuyama; Katsushi Sugita, all of Nagoya; Kazutoyo Shimizu; Naoyuki Okamoto, both of Mishima-gun, all of (JP)

(73) Assignees: Narumi China Corporation, Nagoya; Sumitomo Special Metals Co., Ltd., Osaka, both of (JP)

( * ) Notice: Under 35 U.S.C. 154(b), the term of this patent shall be extended for 0 days.

(21) Appl. No.: 09/218,074

(22) Filed: Dec. 22, 1998

(30) Foreign Application Priority Data

Dec. 26, 1997 (JP) .................................... 9-369158

(51) Int. Cl.[7] ..................................... B24B 21/18
(52) U.S. Cl. ........................... 451/443; 501/89; 501/130; 501/131; 501/141; 501/154; 264/36.18; 264/679; 264/682; 264/642; 264/643; 156/250; 156/268; 428/34.4; 428/325; 428/453; 428/454; 428/688; 428/428; 83/174; 427/419.7; 125/2
(58) Field of Search .............................. 501/89, 130, 131, 501/141, 154; 451/443; 264/36.18, 679, 682, 642, 643; 428/428, 34.4, 325, 453, 454, 688; 83/174; 156/250, 268; 427/419.7; 76/46, 47.1; 438/464; 125/2

(56) References Cited

U.S. PATENT DOCUMENTS 4,667,650 * 5/1987 Girard et al. .
4,719,151 * 1/1988 Chyung et al. .
5,306,554 * 4/1994 Harrison et al. .
5,679,119 * 10/1997 Freeman et al. .

FOREIGN PATENT DOCUMENTS 2-303768 12/1990 (JP) .
9-309070 12/1997 (JP) .

* cited by examiner

Primary Examiner—Stanley B. Silverman
Assistant Examiner—Michael P. Colaianni
(74) Attorney, Agent, or Firm—Oblon, Spivak, McClelland, Maier & Neustadt, P.C.

(57) ABSTRACT

A ceramics dress substrate of the present invention capable of both performances of cutting a cut material with a high accuracy and dressing a diamond cutting grindstone with an excellent cutting property and an reduced wearing amount of the grindstone. This ceramics dress substrate comprises sintering a mixture of ceramics grinding particles and a silicate mineral, The ceramics grinding particles are preferably uniformed and have a scratch hardness ranging from 6 to 10. Alumina grinding particles, silicon carbide and mullite are preferably used as the ceramics grinding particles, and a kaolin mineral, pyrophyllite, montmorillonite, sericite, talc and chlorite are preferably used as the silicate mineral. The ceramics dress substrate is preferably coated with glass.

10 Claims, 4 Drawing Sheets

(500 x magnification)

CERAMICS DRESS SUBSTRATE AND METHOD OF USING THE DRESS SUBSTRATE

BACKGROUND OF THE INVENTION

1. Field of the Invention

The present invention relates to a ceramics dress substrate capable of both cutting work and dressing a grindstone during cutting.

2. Description of the Related Arts

When a material such as hard-cut ceramics is cut, clogging of the grindstone raises a problem. When the clogging is generated, cutting resistance of the grindstone is increased and no material can be precisely cut, thereby exerting an influence on the yield of the processed product.

To solve such a problem, dressing of the grindstone is conventionally performed. The dressing is generally intermittently performed between cutting work processes.

Porous alumina sintered at a high temperature of 1600° C. or higher by adding an oxide such as MgO, CaO, and the like to alumina, and a material obtained by adding feldspar or artificial frit to uniformed ceramics grinding particles are known as a dress substrate.

However, since the above porous alumina is sintered at a high temperature of 1600° C. or higher, each of the above alumina particles becomes round so that the performance of the dressing substrate cannot be sufficiently fulfilled.

Moreover, the material obtained by adding feldspar or artificial frit to the uniformed ceramics grinding particles can be sintered at a temperature lower than 1600° C. so that each of the grinding particles does not become round. Accordingly, the performance of the dressing substrate can be sufficiently fulfilled. However, since the feldspar or artificial frit enters clearances of the ceramics grinding particles, the dressing substrate is closely formed and thus the dressing substrate itself is hardened. Therefore, wear of the cutting grindstone is increased and the life of the grindstone is shortened. Further, the cutting resistance value is increased and the cut material cannot be precisely cut.

Japanese Laid-Open Patent Publication No. 53-89364 discloses an art to overcome the clogging of the grindstone by producing a dress substrate with silica. Although the clogging problem is solved, dressing of the diamond grindstone is still insufficient. Further, this art cannot be used for both cutting work and dressing.

Japanese Laid-Open Patent Publication No. 1-188267 discloses a dress substrate using a glass material as a base material. However, similar to the material obtained by adding feldspar or artificial frit, the dress substrate is hardened and the wearing amount of the grindstone is increased, and thus the life of the grindstone is shortened. Moreover, the cutting resistance value is increased and cutting accuracy is low.

The cut material and the dress substrate are adhered to each other by a melted solder material. Therefore, when resin is used as a mold material of the dress substrate, a problem exists in that the resin is deformed at a melting temperature of the solder material ranging from 100 to 150° C.

SUMMARY OF THE INVENTION

In consideration of such conventional problems, the present invention provides a ceramics dress substrate capable of both cutting work with high accuracy and dressing the cutting grindstone, and having an excellent cutting property with reduced wearing of the grindstone.

The ceramics dress substrate in this invention comprises sintering a mixture of ceramics grinding particles and a silicate mineral.

The ceramics dress substrate of the present invention comprises sintering the ceramics grinding particles and the silicate mineral.

Here, the ceramics grinding particles mainly function as dressing a grindstone.

When the grinding particles are small, no grindstone can be sufficiently dressed. Conversely, when the grinding particles are large, wear of the grindstone may possibly increase. When the grinding particle size is varied, the dressing property of the grindstone cannot be stabilized. Accordingly, it is preferable if the ceramics grinding particles are uniform without unevenness in particle size.

In the present invention, as the ceramic grinding particles included in the ceramic dress substrate are uniformed, problems caused by the unevenness in grinding particles as mentioned above can be avoided, leading to a stable cutting resistance. Accordingly, life of the grindstone can be lengthened by performing the cutting work using the ceramic dress substrate of the present invention so that the cost of the cutting work is reduced.

Further, since the silicate mineral functions as a binding material of the ceramic grinding particles, the mixture with the ceramic grinding particles can be sintered even at a temperature lower than 1600° C. Therefore, no ceramic grinding particles become round so that each of the ceramic grinding particles can remain sharp. Accordingly, excellent cutting properties are obtained and the amount of ware of the grindstone can be restrained.

The ceramic dress substrate of the present invention is capable of both performing a cutting with high accuracy and dressing a diamond cutting grindstone, with excellent cutting properties and reduced wear of the grindstone. Further, coating the surface of the ceramic dress substrate with glass leads to giving added value thereto. Namely, the cut material can be adhered to the dress substrate by a solder material so that the dress substrate can be directly vacuum adsorbed to the stage of a precision cutting machine.

DETAILED DESCRIPTION OF THE INVENTION

Figure 1:
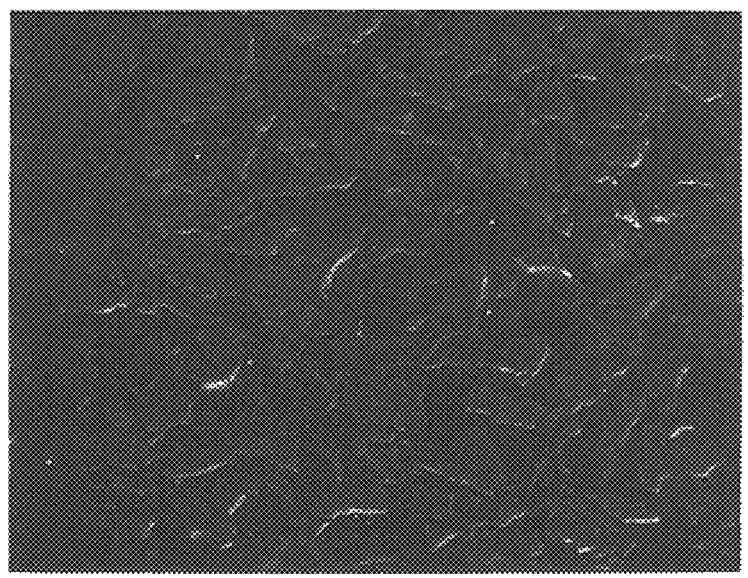
FIG. 1 is a view of a SEM photograph (500× magnification) for showing the structure of a broken polishing surface of a ceramics dress substrate in Example 1.

It is preferable that the above ceramic grinding particles have a scratch hardness ranging from 6 to 10. In this range, a grindstone made of diamond, etc., can be effectively dressed while a low cutting resistance is maintained. In contrast, when the scratch hardness is smaller than 6, dressing effect may be lowered. When the scratch hardness exceeds 10, the amount of wear of the grindstone at cutting time using a ceramics dress substrate may increase.

The above ceramic grinding particles are formed by, for example, one or more than two kinds selected from the group of alumina grinding particles, silicon carbide and mullite.

The ceramic grinding particles preferably have a particle diameter ranging from 5 to 50 $\mu$m. In this range, the dressing effect of the grindstone is increased and wearing of the grindstone can be restrained. In contrast to this, when the particle diameter is smaller than 5 $\mu$m, the dressing effect may be lowered. When the particle diameter exceeds 50 $\mu$m, the wearing amount of the grindstone is increased, making life of the grindstone short.

Preferably, the shape of the ceramic grinding particles is sharp, having no round edges. This leads to a further improved dressing property of the ceramic dress substrate.

Preferably, the above silicate mineral is constituted of one or more than two kinds selected from a strong acid salt mineral group of kaolin mineral, pyrophyllite, montmorillonite, sericite, talc, chlorite, and the like. In this case, a mixture with the above ceramic grinding particles can be sintered at a low temperature. Further, the ceramic grinding particles can remain sharp so that an excellent dressing effect can be given to the ceramic dress substrate.

Preferably, the above ceramic dress substrate is constituted of 30 to 99 weight % of the ceramic grinding particles and 1 to 70 weight % of the silicate mineral. When the weight percent of the ceramic grinding particles is smaller than 30 weight %, or the weight percent of the silicate mineral exceeds 70 weight %, the ratio of the ceramic grinding particles in the entire ceramic dress substrate is reduced, resulting in an insufficient dressing of grindstones. Further, when the weight percent of the ceramic grinding particles exceeds 99 weight %, or the weight percent of the silicate mineral is smaller than 1 weight %, no ceramic grinding particles are sintered at a low temperature in a range of 1000 to 1600°, and thus it may be difficult to obtain the ceramic dress substrate by the low temperature sintering.

Preferably, the above ceramic dress substrate is sintered at a temperature in a range of 1000 to 1600° C. When the temperature is lower than 1000° C., the strength of the ceramic dress substrate may be reduced, resulting in formation of cracking or chipping or the like in use. When the temperature is 1600° C. or higher, the ceramic grinding particles become round, and thus the original performance of the dressing of the grindstone may not be sufficiently fulfilled.

Preferably, a glass impregnated portion is provided on a surface of the above ceramic dress substrate. In this case, no ceramics dress substrate is deformed by heating a solder material at its melting temperature. Accordingly, the ceramic dress substrate can be adhered to a cut material by heat softening solder material. Further, the surface of the ceramic dress substrate is closely formed so that the ceramic dress substrate can be vacuum fixed to the stage of a cutting machine.

Preferably, glass is constituted of a low-melting glass. The ceramic grinding particles in the ceramic dress substrate are re-bonded by melting the low-melting glass so that a change in shape of each of the ceramic grinding particles can be reduced.

The above low-melting glass is glass flowing at a temperature about 600° C. lower. This low-melting glass is constituted of $PbO-B_2O_3$ glass, $PbO-B_2O_3-R_2O-R'O$ glass, $PbO-B_2O_3-SiO_2$ glass, $PbO-B_2O_3-SiO_2-R_2O-R'O$ glass, $PbO-B_2O_3-SiO_2-R''_2O_3$ glass, $PbO-B_2O_3-SiO_2-R''_2O_3'-R_2O-R'O$ glass, and the like. The above R is constituted of, for example, Li, Na, K, Cu, Zn, and the like, and the above R' is constituted of Mg, Ca, Ba, Sr, and the like. Further, for example, the above R" is constituted of Bi and the like.

Preferably, the composition of the glass has 50% or more of lead content. With this content, the glass is allowed to be baked to the ceramic dress substrate at a low temperature from 500 to 800° C.

Preferably, the glass-impregnated portion molded in the above ceramic dress substrate has a thickness in a range of 10 to 400 $\mu$m. When this thickness is smaller than 10 $\mu$m, a portion with which a glass component is not substantially impregnated is formed, and thus the solder material melted by heat permeates the interior of the ceramic dress substrate and the ceramic dress substrate may not be adhered to the cut material. When the above thickness exceeds 400 $\mu$m, the cut resistance value is increased because of the molded glass. Therefore, the cut material may not be precisely processed.

When a ceramic substrate for a magnetic head and a hard substrate of SiC, $ZrO_2$, ferrite, alumina, and the like are cut by a cutting machine, the ceramic dress substrate of the present invention can be used as a supporting plate of each of these substrate and a substrate for dressing the grindstone.

EXAMPLES

Example 1

90 weight % of uniformed alumina grinding particles having an average particle diameter of 20 $\mu$m and 10 weight % of a silicate mineral were admixed. An organic binder and water were then added thereto and wet mixing was performed to obtain a suspension. Water-soluble acrylic, methyl cellulose and polyvinyl alcohol were used as the organic binder.

Next, this suspension was molded and dried, and then sintered for two hours at 1150° C. Thus, a ceramic dress substrate having a porosity of 45% and a size of 100 mm×100 mm×3.0 mm was obtained. A broken surface of this ceramic dress substrate was observed by a SEM (means a scanning type electron microscope and is similarly used hereinafter). FIG. 1 shows a SEM photograph of the ceramic dress substrate. In this figure, a gray part shows ceramic grinding particles and a black part shows the silicate mineral. It is seen from FIG. 1 that diameters of the ceramic grinding particles are approximately uniformed in a range from 15 to 25 $\mu$m and these particles are angular. Further, it is seen that the ceramic grinding particles are bonded to each other by the silicate mineral.

Next, a cutting work was performed on both sides of this ceramic dress substrate to smooth the substrate surface to obtain a size of 100 mm×100 mm×2.0 mm. This example was designated as Example 1.

Comparative Example 1

98 weight % of alumina raw material powder having an average particle diameter of 20 $\mu$m and 2 weight % of MgO powder as a sintering accelerator and a binder were admixed. This mixed powder was then molded and sintered for three hours at 1700° C., and then double-side processing was performed. In this manner, an alumina sintering body having a size of 100 mm×100 mm×2.0 mm and a porosity of 45% was obtained. This example was designated as Comparative Example 1.

Next, the cutting resistance of a cut material was measured when the cut material was cut by the grindstone using the ceramic dress substrate in Example 1 and the alumina sintering body in Comparative Example 1.

Figure 2:
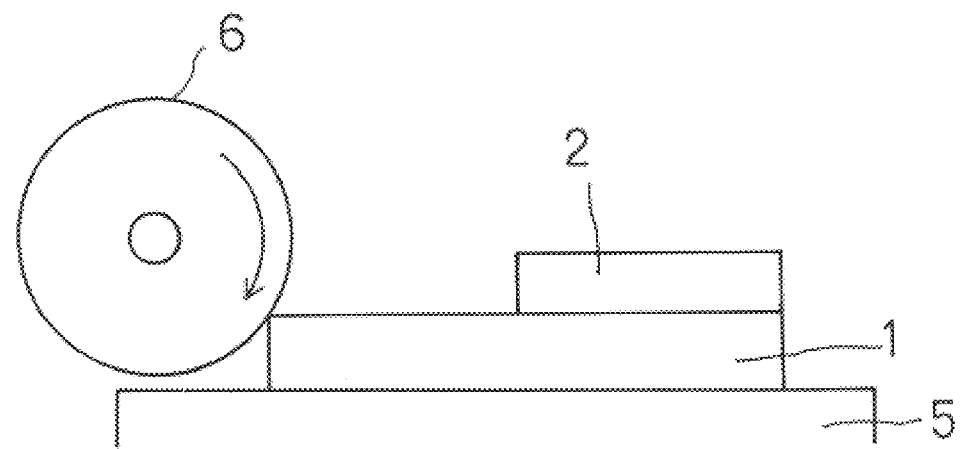
FIG. 2 is an explanatory view showing a method for cutting a cut material by using the ceramics dress substrate in each of Example 1 and Comparative Example 1.

As shown in FIG. 2, the cut material 2 was fixedly adhered to the ceramic dress substrate 1. As the cut material 2, an $Al_2O_3$-TiC substrate having a size 50 mm×20 mm×2.0 mm was used. The obtained was fixed onto a stage 5 of a cutting processor.

Thereafter, the cutting resistance value of the cut material was measured by using an SD#800 metal bond blade (trade name, manufactured by Lead Corp.) having a size of 80 mm in outside diameter×40 mm in inside diameter×0.18 mm in thickness as a grindstone 6 for cutting. Conditions for cutting were set as 10 krpm in spindle revolution number of the grindstone, 0.2 mm in cutting depth of the ceramic dress substrate, and 100 mm×5 times in cutting length of the cut material. A feed rate of the grindstone was changed to 50 mm/minute, 100 mm/minute and 150 mm/minute. The cutting resistance value was shown by a load of the spindle motor. A wearing amount of the grindstone was measured by a groove depth after the cutting work.

Figure 3:
FIG. 3 is a graphical representation showing a change in cutting resistance value of the cut material with respect to a feed rate of a grindstone when the cut material is cut in each of Example 1 and Comparative Example 1.
Figure 4:
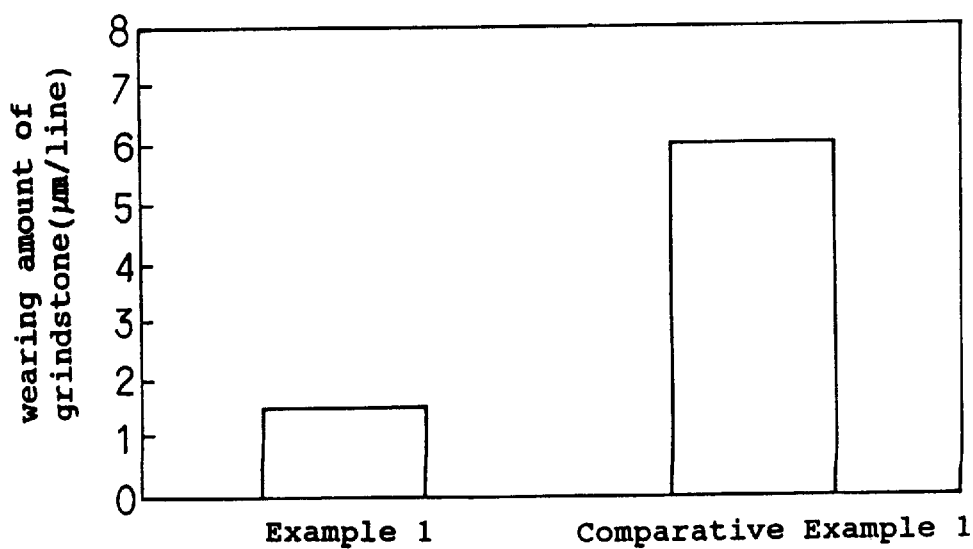
FIG. 4 is a graphical representation showing a wearing amount of the grindstone when the cut material is cut in each of Example 1 and Comparative Example 1.

FIGS. 3 and 4 respectively show measured results of the cutting resistance value of the cut material and the wearing amount of the grindstone in the case of that the ceramic dress substrate in the Example 1 and the alumina sintering body in Comparative Example 1 were used.

As shown in FIG. 3, the cutting resistance values at a cutting speed at each feed rate of the grindstone in both Example 1 and Comparative Example 1 were approximately similar to each other. However, as shown in FIG. 4, the wearing amount of the grindstone of Example 1 is ¼ in comparison with Comparative Example 1 and was therefore small. It is seen from these results that the grindstone can be effectively dressed without any waste in Example 1.

Example 2 and Comparative Example 2

Figure 5:
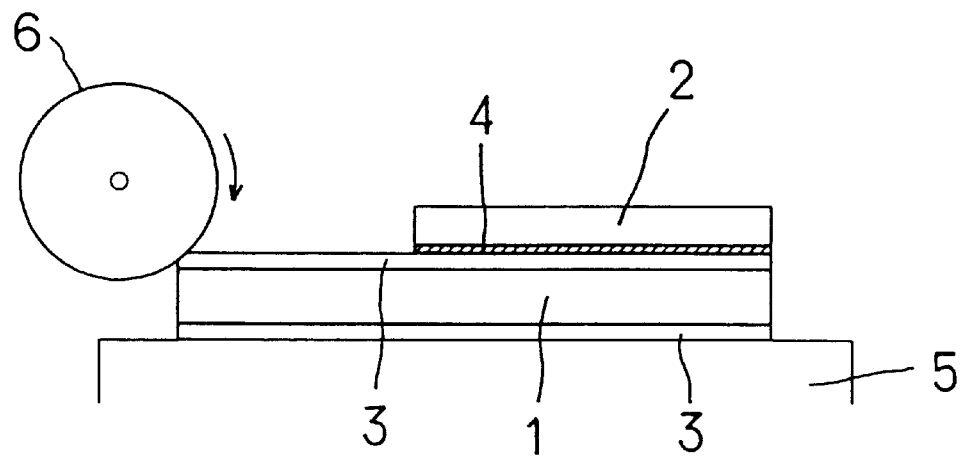
FIG. 5 is an explanatory view showing a method for cutting the cut material in Example 2.

In this example, a glass-impregnated portion 3 which glass was impregnated with was formed on the surface of a ceramic dress substrate 1 as shown in FIG. 5.

Similar to Example 1, the ceramic dress substrate was first produced and grinding processing for surface smoothing was performed on both sides of the ceramic dress substrate. This ceramic dress substrate had a size of 100 mm×100 mm×2.0 mm.

Next, both the sides of the ceramic dress substrate were coated with a borosilicate glass paste having 50% or more of lead content, and thus obtained was again sintered for 15 minutes at 750° C. Then, both the sides of the glass impregnated substrate were ground so that the ceramic dress substrate having a glass impregnated thickness shown in Table 1 was obtained. The thickness of the glass-impregnated portion was set to 50 μm, 200 μm and 350 μm in Example 2 and was set to 0 μm and 600 μm in Comparative Example 2.

Next, the cutting resistance value of the cut material was measured by the measuring method shown in Example 1. Namely, as shown in FIG. 5, the cut material 2 was adhered to the surface of the ceramic dress substrate 1 by a solder material 4, and the cutting resistance value was measured. Conditions for cutting were set as 10 krpm in spindle revolution number, 0.4 mm in cutting depth, 100 mm/minute in feed rate of the grindstone, and 5 times in the number of cutting times.

Further, the vacuum adsorpivity and the adhesion property of the cut material adhered to the solder material were evaluated. The vacuum adsorpivity was judged as "O", in an adsorbable case and "X" as an unadsorbable case. The adhesion property of the cut material adhered to the solder material was judged as "O" when no solder material permeates the interior of the ceramic dress substrate. The adhesion property of the cut material adhered to the solder material was judged as "X" when the solder material permeates the interior of the ceramic dress substrate.

Table 1 shows these measured and evaluated results. As shown in Table 1, when the ceramic dress substrate in Example 2 was used, no clogging was generated at cutting time, and the vacuum adsorpivity and the adhesion condition to the solder material were preferable.

TABLE 1

|  | Example 2 | | | Comparative Example 2 | |
| --- | --- | --- | --- | --- | --- |
| Glass impregnated thickness (μm) | 50 | 200 | 350 | 0 | 600 |
| Cutting resistance (W) value | 90 | 125 | 140 | 78 | Clogging Generation |
| Vacuum adsorptivity condition | O | O | O | X | O |
| Solder material bonding condition | O | O | O | X | O |

Next, a dressing property of the grindstone using the ceramic dress substrate was evaluated.

The evaluated substrate was a ceramic dress substrate similar to that in Example 2. In this ceramic dress substrate, the glass impregnated thickness was set to 100 μm and an alumina sintering body similar to that in Comparative Example 1 was used.

Figure 6:
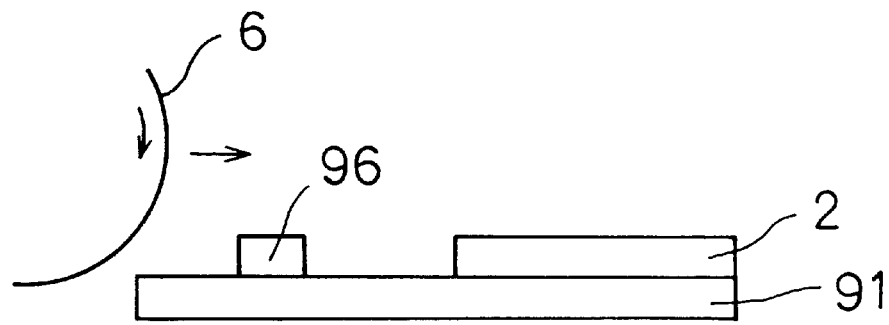
FIG. 6 is an explanatory view showing a method for cutting the cut material in Comparative Example 1.

The cutting resistance value was measured by each of a measuring method shown in FIG. 5 in Example 2 and a measuring method shown in FIG. 6 in Comparative Example 1, respectively. Namely, in the case of Example 2, the ceramic dress substrate 1 in Example 2 was vacuum-adsorbed onto the stage 5 of a cutting processor, as shown in FIG. 5. The cut material 2 was fixedly adhered onto this substrate 1 by a solder material 4. Then, dressing of the grindstone 6 for cutting and a cutting work of the cut material 2 were performed plural times.

In contrast to this, in the case of Comparative Example 1, the cut material 2 was adhered onto an alumina sintering body 91 in Comparative Example 1, and a grindstone 96 for dressing the grindstone 6 for cutting was adhered in front of the cut material 2, as shown in FIG. 6. The dressing and the cutting work were then performed plural times. wearing amounts of the grindstone 6 for cutting in both the examples were set to be equal to each other.

Figure 7:
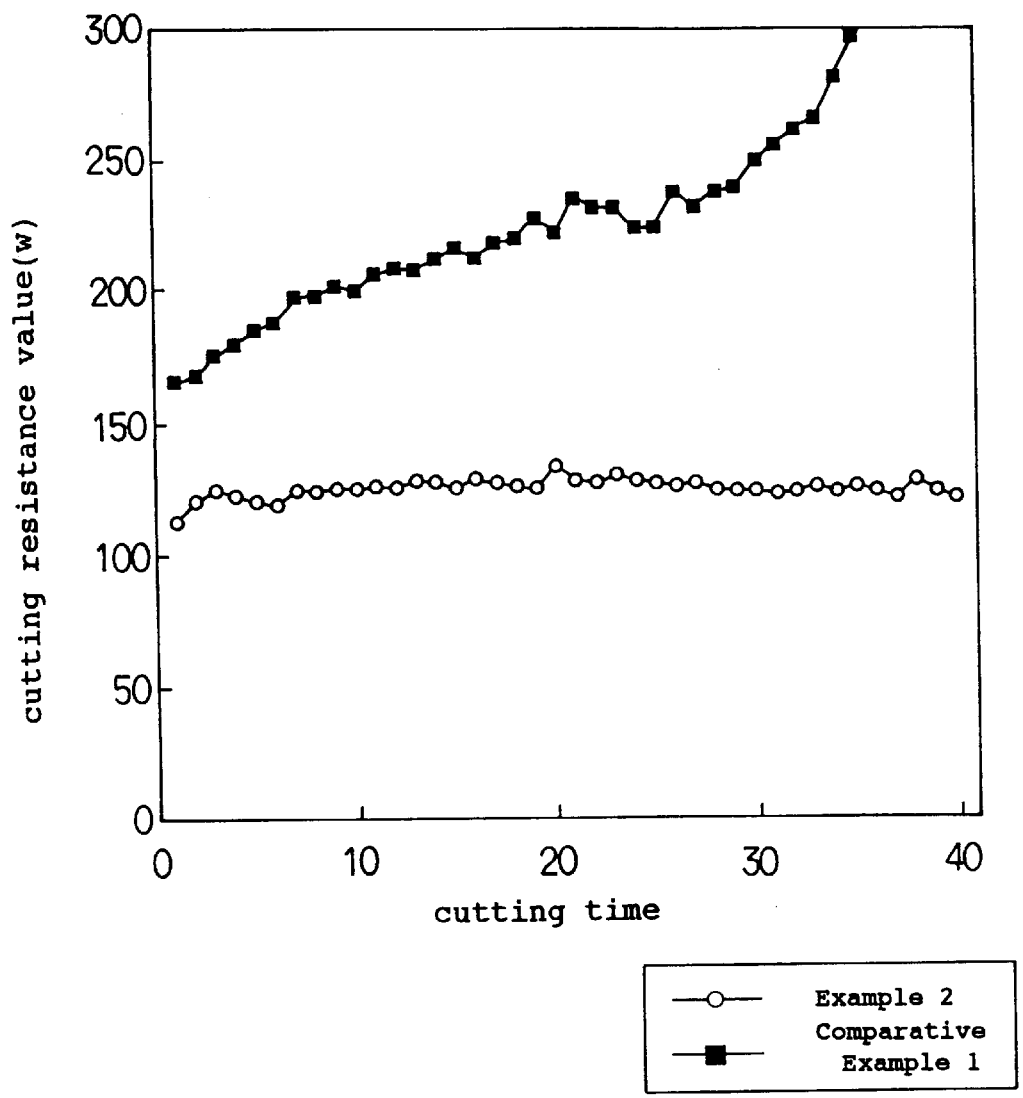
FIG. 7 is a graphical representation showing a change in cutting resistance value of the cut material in accordance with cutting times when the cut material is cut in each of Example 2 and Comparative Example 1.

Similar to Example 1, the cutting resistance value of the grindstone was measured. The cut material and the grindstone for cutting were constituted by using the same ones as the cut material and the grindstone for cutting used in Example 1. The cutting condition was set to 10 krpm in spindle rotating number, 0.4 mm in cutting depth and 150 mm/minute in feed rate of the grindstone. FIG. 7 shows these measured results.

As seen from FIG. 7, the cutting resistance value of the cut material was stable even when the cutting work was performed many times on the ceramic dress substrate in Example 2. In contrast to this, in the, case of Comparative Example 1, the cutting resistance value was increased every time the cutting work was performed, thereby finally causing clogging of the grindstone. Accordingly, the cutting work can be performed while in-process dressing of the grindstone is effectively performed in Example 2, and an improved processing efficiency using a high speed processing will be also achieved.

What is claimed is:

1. A ceramic dressing substrate which comprises a sintered mixture of ceramic grinding particles and a silicate mineral; said dressing substrate being adhered to a material to be cut with a grindstone, in a cutting processor.

2. The ceramics dressing substrate according to claim 1, wherein the ceramic grinding particles are selected from the group consisting of alumina grinding particles, silicon carbide and mullite.

3. The ceramic dressing substrate according to claim 1, wherein the silicate mineral contains one or more minerals selected from the group consisting of a kaolin mineral, pyrophyllite, montmorillonite, sericite, talc, and chlorite.

4. The ceramic dressing substrate according to claim 1, containing 30 to 99 weight % of the ceramic grinding particles and 1 to 70 weight % of the silicate mineral.

5. The ceramics dressing substrate according to claim 1, having a glass impregnated portion on a surface thereof.

6. A method for in-process dressing of a grind stone, comprising:

cutting with a grind stone a material that is adhered to a ceramic dressing substrate, said dressing substrate comprising a sintered mixture of ceramic grinding particles and a silicate mineral matrix.

7. The method of claim 6, wherein the ceramic grinding particles are one or more particles selected from the group consisting of alumina grinding particles, silicon carbide and mullite.

8. The method of claim 6, wherein the silicate mineral matrix contains one or more minerals selected from the group consisting of kaolin mineral, pyrophyllite, montmorillonite, sericite, talc and chlorite.

9. The method of claim 6, wherein the ceramic dressing substrate contains 30 to 99 wt. % of the ceramic grinding particles and 1 to 70 wt. % of the silicate mineral.

10. The method of claim 6, wherein the ceramic dressing substrate further comprises a glass-impregnated portion on the surface thereof.

* * * * *